United States Patent [19]

Soupal

[11] 4,207,563

[45] Jun. 10, 1980

[54] GAS CHARGED ACCUMULATOR WITH FAILURE INDICATOR

[75] Inventor: Thomas R. Soupal, Owosso, Mich.

[73] Assignee: Midland-Ross Corporation, Cleveland, Ohio

[21] Appl. No.: 913,646

[22] Filed: Jun. 8, 1978

[51] Int. Cl.[2] ........................ G08B 21/00; F16K 37/00

[52] U.S. Cl. .................................... 340/626; 137/557; 138/31; 138/104; 340/632

[58] Field of Search ............... 340/626, 603, 632, 605, 340/614, 611; 116/70; 137/557; 138/31, 104; 200/82 E, 82 R, 81 R, 83 A

[56] References Cited

U.S. PATENT DOCUMENTS

| | | | |
|---|---|---|---|
| 2,238,234 | 4/1941 | Stansfield | 340/626 |
| 2,696,606 | 12/1954 | De La Pomeue | 340/614 |
| 3,508,236 | 4/1970 | Adams | 340/626 |
| 3,965,317 | 6/1976 | Gratzmuller | 340/614 |
| 4,063,057 | 12/1977 | Meisenheimer | 340/626 |

*Primary Examiner*—John W. Caldwell, Sr.
*Assistant Examiner*—James J. Groody
*Attorney, Agent, or Firm*—H. Duane Switzer

[57] ABSTRACT

A gas charged accumulator includes a gas chamber and a hydraulic reservoir on opposite sides of a movable member. A fill passage for pressurizing the gas chamber includes a movable operating device for operating an indicator when the accumulator is substantially discharged. Gas flows directly past the indicator operating device when the gas chamber is pressurized through the fill passage. A normally closed switch assembly is mounted in the fill opening outwardly of the indicator operating device subsequent to pressurization of the gas chamber. The indicator operating device holds the switch assembly in an open position when the accumulator is charged and provides closing of the switch when the accumulator is substantially discharged.

10 Claims, 2 Drawing Figures

GAS CHARGED ACCUMULATOR WITH FAILURE INDICATOR

BACKGROUND OF THE INVENTION

This application relates to the art of gas charged accumulators and, more particularly, to failure indicators for such accumulators. The improved failure indicator arrangement of the present application will be described with particular reference to a gas charged hydraulic accumulator. However, it will be appreciated that the invention has broader aspects and can be used for indicating failures in other pressurized chambers.

It is common to provide accumulators with indicators for indicating whether the accumulator is charged or discharged. Remote indicators in the form of a light or buzzer require an electrically operated switch attached to the accumulator. Previous arrangements of this type have been very expensive to manufacture and assemble because the switch mechanism and fill inlet to the gas chamber have been separate from one another, or the switch assembly has been very complicated.

SUMMARY OF THE INVENTION

A gas charged accumulator includes a gas chamber and a hydraulic fluid reservoir on opposite sides of a movable separating member. The gas chamber has a fill passage through which such chamber is pressurized, and the reservoir has an opening through which hydraulic fluid flows to and from the reservoir. Indicator operating means is mounted in the fill passage for operating indicating means which indicates a discharged condition of the reservoir.

In one arrangement, biasing means is provided for normally biasing the indicator operating means to an indicator operating position. The indicator operating means is then responsive to a predetermined pressure in the gas chamber representative of a charged condition of the reservoir for movement out of its indicator operating position.

The indicator operating means normally blocks flow of gas out of the gas chamber through the fill passage, and bypass means is provided for allowing flow through the fill passage into the gas chamber directly past the indicator operating means.

In one arrangement, the indicator operating means includes a piston, and bypass means is defined by a piston passage through the piston and a check valve is provided in the piston passage.

A normally closed switch assembly is mounted in the fill passage outwardly of the indicator operating means. The indicator operating means is operative to hold the switch assembly in an open position when the gas chamber is at a pressure indicative of a charged condition of the reservoir.

The switch assembly positioned in the fill passage includes spaced terminals between which a spring and plunger are positioned. The spring engages one of the terminals and normally biases the plunger into engagement with the other terminal so that an electrical circuit is completed through the spring and plunger between the terminals. The indicator operating means is operative to hold the plunger out of engagement with the other terminal when the gas chamber is at a pressure indicative of a charged condition of the reservoir.

It is a principal object of the present invention to provide a gas charged hydraulic accumulator with an improved indicating device for indicating a discharged condition of the accumulator.

It is another object of the invention to provide an indicator for a gas chamber to provide a remote indication when the gas chamber is discharged to a dangerously low level.

It is also an object of the invention to provide an indicator for indicating a discharged condition of a gas chamber in a very economical and simplified manner.

DESCRIPTION OF A PREFERRED EMBODIMENT

Figure 1:
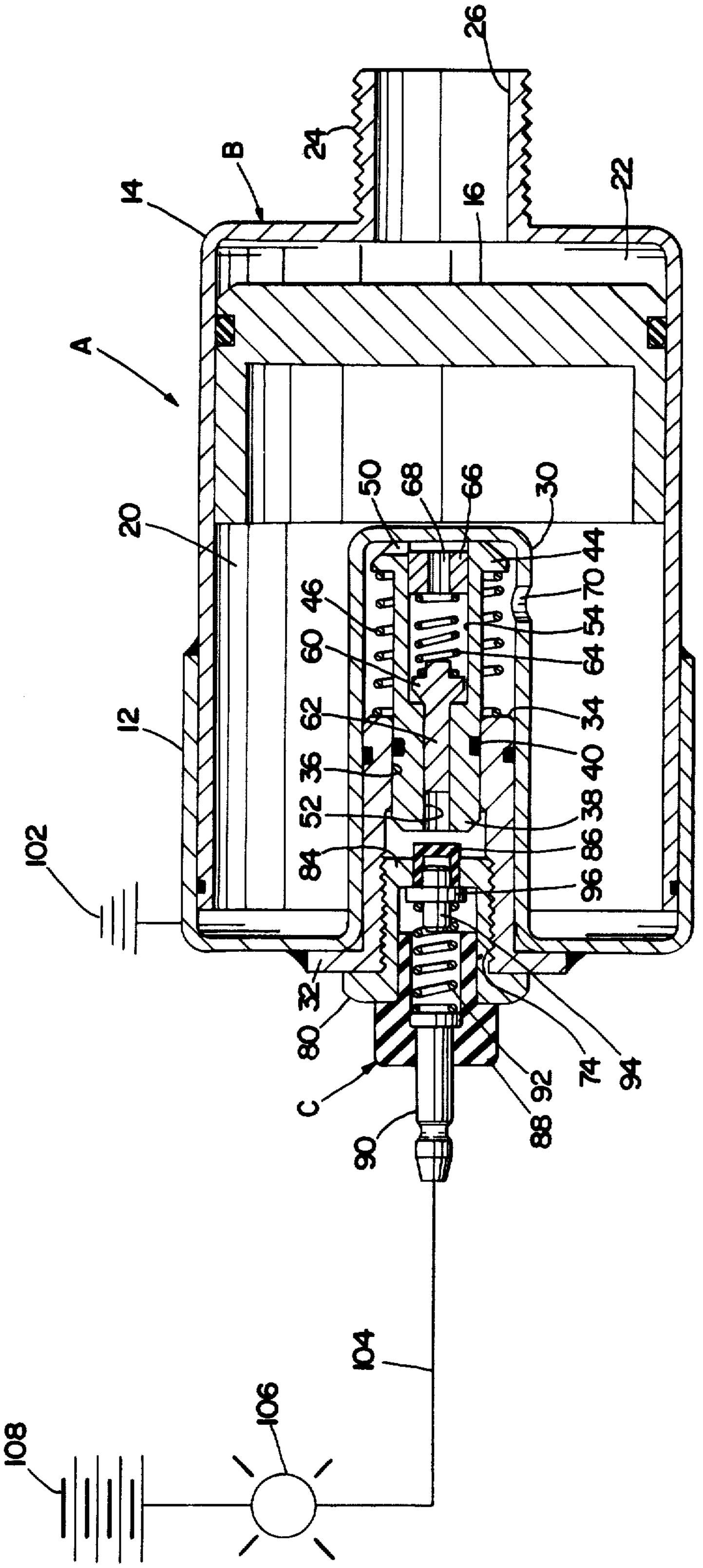
FIG. 1 is a cross-sectional elevational view of a gas charged hydraulic accumulator having the improved indicator system of the present application incorporated therein.

With reference to the drawing, FIG. 1 shows a gas charged hydraulic accumulator A including a housing B formed by cooperating housing parts 12 and 14 welded or otherwise suitably secured together to provide a generally cylindrical interior cavity having a piston 16 in sealed sliding relationship therewith to define a gas chamber 20 on one side thereof and a hydraulic reservoir 22 on the other side thereof. A threaded nut 24 on housing B is attachable to any suitable source of hydraulic fluid, and surrounds an opening 26 through which hydraulic fluid flows to and from hydraulic fluid reservoir 22.

Housing part 12 includes an elongated central cylindrical cup portion 30 extending into gas chamber 20. A sleeve member 32 is received in cup portion 30 and has a radial circumferential flange welded or otherwise secured to the exterior surface of housing part 12. Sleeve member 32 has an inner end 34 spaced substantially from the bottom end of cup portion 30.

Sleeve 32 has a smooth cylindrical internal bore 36 at its inner end portion slidably receiving a piston 38 carrying an external circumferential seal 40 in sliding sealing engagement with bore 36. Piston 38 has an outwardly extending circumferential flange 44 on its rear end, and a coil spring 46 received over piston 38 acts between sleeve end 34 and piston flange 44 for normally biasing piston 38 to the right.

The rear end of piston 38 has a plurality of circumferentially-spaced radial flutes 50 therein for establishing communication between the exterior and interior of piston 38 when the rear end thereof is bottomed against the bottom end of cup portion 30. A central bore 52 in the front end portion of piston 38 intersects a larger bore 54 in the rear end portion thereof. Bores 52 and 54 together provide an axial passage completely through piston 38. A check valve member 60 has an elongated cylindrical stem 62 slidably received in bore 52. A coil spring 64 positioned in large bore 54 has one end bearing against check valve member 60 and an opposite end bearing against a stop member 66 press fit or otherwise secured within bore 54 in longitudinally-spaced relationship to the rear end of piston 38. An axial hole 68 is provided through stop member 66.

At least lateral hole 70 in cup portion 30 establishes communication of gas chamber 20 with the interior of cup portion 30. The interior of cup portion 30 communicates through piston flutes 50 with hole 68 in stop member 66. In order to charge gas chamber 20 with gas pressure, a fitting is threaded into threaded opening 74 in sleeve member 32. The fitting may have a projection for engaging check valve 60 and shifting same to the right, or gas pressure itself supplied through the fitting may displace check valve 60 to the right. Gas then flows through piston bore 52 past check valve 60, through piston bore 54, through hole 68 in stop member 66, through piston flutes 50 and through transverse hole 70 in cup member 30 to chamber 20. Once gas chamber 20 has been charged to a predetermined desired pressure, such as around 100 psi, the fitting is removed and check valve 60 closes piston bore 52 for preventing escape of gas pressure from gas chamber 20. With a pressure of around 100 psi within gas chamber 20, spring 46 holds piston 38 bottomed against the bottom of cup portion 30 as shown in FIG. 1. Piston 16 is also displaced to the right as shown in FIG. 1.

Once gas chamber 20 is pressurized, a switch assembly C is threaded into opening 74 in sleeve member 32. Bushing 80 has an inner end 84 defining one switch terminal and includes a central hole slidably receiving a button member 86 of dielectric material. A cap member 88 has a pin 90 suitably secured thereto and extending outwardly therefrom. Cap member 88 is threaded or otherwise suitably secured to bushing 80 to provide an internal cavity in which a spring 92 and a plunger 94 are positioned. Plunger 94 has a substantially central outwardly extending circumferential collar 96. Spring 92 has one end bearing against a switch terminal defined by pin 90, and its other end bearing against plunger collar 96 for normally engaging collar 96 with the bottom end 84 of bushing 80 which also defines a switch terminal.

Accumulator housing B is grounded as at 102, while pin terminal 90 is suitably connected by wire 104 with an indicator 106 in the form of a light, bell or buzzer. A battery or other voltage source 108 is suitably connected with indicator 106.

Figure 2:
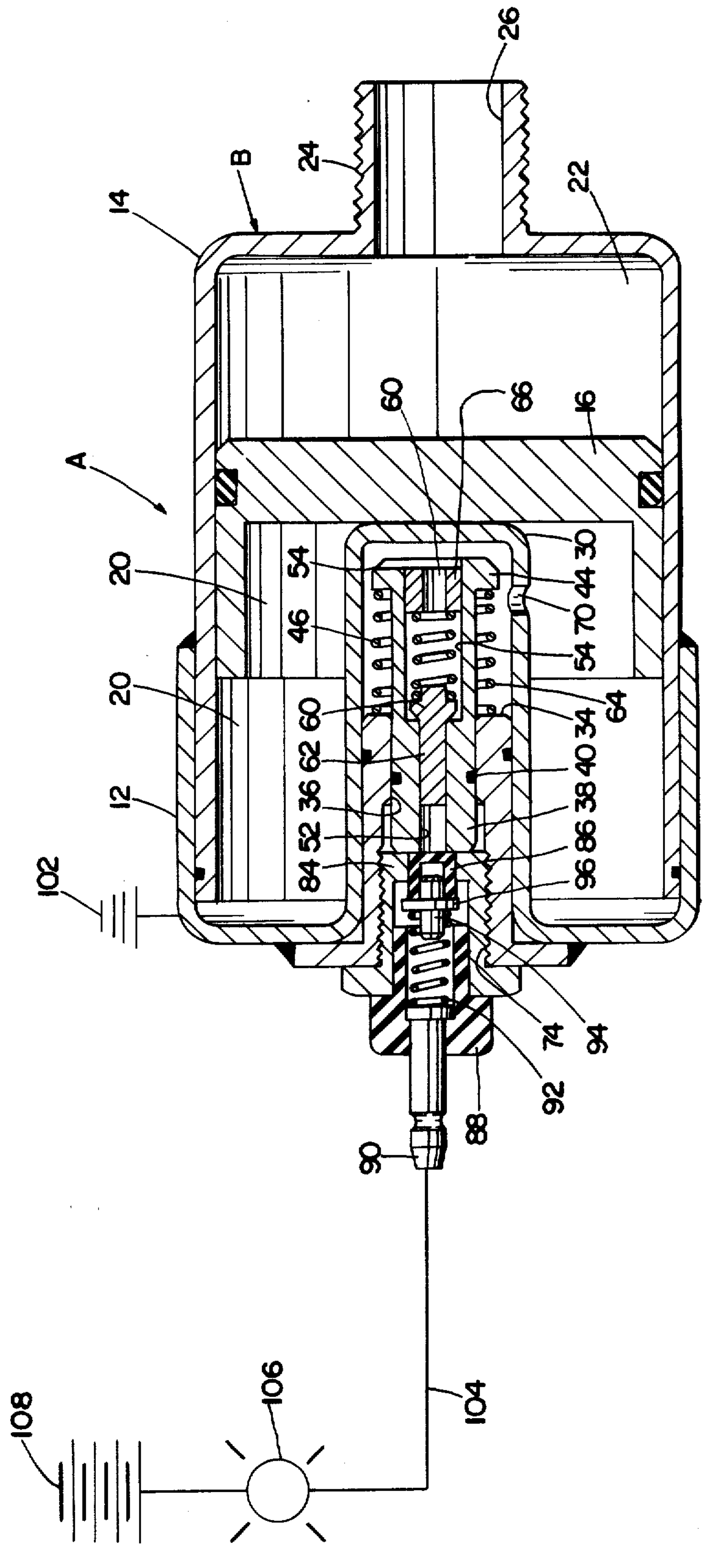
FIG. 2 is a view similar to FIG. 1 but showing the indicator in a different position representative of a charged condition of the accumulator.

When threaded stem 24 of accumulator A is connected to a pressurized hydraulic circuit, hydraulic fluid enters reservoir 22 and moves piston 16 to the left until it bottoms against cup portion 30. At this time, the gas pressure within gas chamber 20 will be approximately 200 psi. When piston 16 has moved sufficiently from its righthand position of FIG. 1 toward the left position of FIG. 2 so that the pressure in gas chamber 20 is around 150 psi, the pressure acting upon piston 38 generally within seal 40 overcomes the force of spring 46 and moves the piston 38 to the left into the position of FIG. 2. The front end of piston 38 contacts dielectric button 86 for moving switch plunger 94 to the left and disengaging plunger collar 96 from switch terminal 84. Indicator 106 will then be de-energized and this represents the charged condition of accumulator A. If gas pressure leaks from gas chamber 20, or when reservoir 22 is sufficiently discharged for lowering the gas pressure to around 150 psi, spring 46 will move piston 38 from the position of FIG. 2 to the position of FIG. 1. Spring 92 will then move switch plunger 94 to the right for engaging plunger collar 96 with switch terminal 84. This will complete a circuit through indicator 106 for indicating a discharged condition of the accumulator. The indicator preferably operates before accumulator A is completely discharged so that some operational capacity will still remain when an operator is warned of a dangerously discharged condition.

With the exception of dielectric button 86, the other parts are electrically conductive to complete the electrical circuit through switch assembly C, sleeve 32 and housing B.

The interior of cup portion 30 defines a cylindrical cavity which cooperates with the other parts to provide a fill opening or fill passage for gas chamber 20. Indicator means 106 for indicating a discharged condition of gas chamber 20 is operated by switch assembly C which effectively defines an indicator operating assembly mounted in the fill opening or fill passage. Piston 38 defines an indicator operating means for cooperating with the switch or operating assembly C to operate indicator means 106 in response to a discharged condition of gas chamber 20. The central passage through piston 38 defined by bores 52, 54 is normally closed by check valve 60 which effectively provides a bypass means for providing flow directly past piston 38 into gas chamber 20 while preventing reverse flow.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A gas chamber having a fill opening through which said chamber is chargeable with gas pressure, indicator means for indicating a discharged condition of said chamber, said indicator means including an indicator operating assembly mounted in said opening, movable pressure responsive indicator operating means for cooperating with said operating assembly to operate said indicator means in response to a discharged condition of said chamber, and said chamber being chargeable with gas pressure through said fill opening and through said pressure responsive indicator operating means when said indicator operating assembly is removed from said opening.

2. The gas chamber of claim 1 wherein said indicator operating means includes a piston having a central passage therethrough, and check valve means in said passage for providing flow therethrough in a direction for charging said chamber with gas pressure and preventing flow therethrough in a reverse direction.

3. The gas chamber of claim 1 wherein said indicator operating assembly includes a normally closed switch assembly mounted in said fill opening, said switch assembly being held in an open position by said pressure responsive indicator operating means when said gas chamber is pressurized, and said indicator operating means being movable away from said switch assembly in response to a discharged condition of said chamber for movement of said switch assembly to its closed position.

4. The gas chamber of claim 3 wherein said switch assembly includes spaced terminals between which an electrically conductive spring and plunger means are positioned with said spring engaging one said terminal and biasing said plunger means into engagement with the other said terminal so that a circuit is normally completed between said terminals through said spring and plunger means, and said indicator operating means being operative for holding said plunger means out of engagement with said other terminal when said chamber is charged to a predetermined pressure.

5. The gas chamber of claim 4 including a button of dielectric material interposed between said plunger means and said indicator operating means.

6. The gas chamber of claim 1 including a central elongated generally cylindrical cavity in said chamber having an open outer end defining said fill opening, passage means between said cavity and chamber adjacent the bottom end of said cavity for providing communication between said cavity and chamber, said indicator operating means including a piston slidable in said cavity in a direction between said cavity bottom end and open end, biasing means for biasing said piston toward said cavity bottom end, said piston being responsive to a predetermined pressure in said chamber for moving away from said cavity bottom end, said piston normally blocking flow between said fill opening and said passage means, said piston having a piston passage therethrough for establishing communication between said fill opening and said passage means, and check valve means in said piston passage for providing flow from said fill opening to said passage means while blocking reverse flow.

7. A gas charged hydraulic accumulator having a gas chamber and a hydraulic fluid reservoir on opposite sides of a movable separating member, said gas chamber having a fill passage through which said chamber is pressurized, said reservoir having an opening through which hydraulic fluid flows to and from said reservoir, indicator operating means in said fill passage for operating indicating means indicative of a discharged condition of said reservoir, biasing means for normally biasing said indicator operating means to an indicator operating position, said indicator operating means being responsive to a pressure in said gas chamber representative of a charged condition of said reservoir for movement out of said indicator operating position, said indicator operating means normally blocking flow of gas out of said gas chamber through said fill passage, and bypass means for providing flow through said fill passage into said gas chamber directly past said indicator operating means.

8. The accumulator of claim 7 wherein said indicator operating means comprises a piston and said bypass means is defined by a piston passage through said piston and a check valve in said piston passage.

9. The accumulator of claim 7 including a normally closed switch assembly mounted in said fill passage outwardly of said indicator operating means, and said indicator operating means being operative to hold said switch assembly in an open position when said gas chamber is at a pressure indicative of a charged condition of said reservoir.

10. The accumulator of claim 9 wherein said switch assembly includes spaced terminals between which a spring and plunger means are positioned, said spring engaging one of said terminals and normally biasing said plunger means into engagement with the other said terminal, and said indicator operating means being operative to hold said plunger means out of engagement with said other terminal when said gas chamber is at a pressure indicative of a charged condition of said reservoir.

* * * * *